(12) United States Patent
Takahashi

(10) Patent No.: US 6,346,576 B1
(45) Date of Patent: Feb. 12, 2002

(54) ETHYLENE RESIN PACKAGING FILMS

(75) Inventor: Mamoru Takahashi, Yamaguchi (JP)

(73) Assignee: Mitsui Chemicals Inc, Tokyo (JP)

(*) Notice: Subject to any disclaimer, the term of this patent is extended or adjusted under 35 U.S.C. 154(b) by 0 days.

(21) Appl. No.: 09/646,475

(22) PCT Filed: Jan. 19, 1999

(86) PCT No.: PCT/JP99/00153

§ 371 Date: Sep. 19, 2000

§ 102(e) Date: Sep. 19, 2000

(51) Int. Cl.$^7$ ............... C08F 10/02; C08L 23/04; C08J 5/18
(52) U.S. Cl. ........................ 525/191; 525/240
(58) Field of Search ................... 525/191, 240

(56) References Cited

U.S. PATENT DOCUMENTS 5,464,905 A * 11/1995 Tsutsui et al. ............... 525/240
5,530,065 A * 6/1996 Farley et al. ................ 525/240
5,770,318 A * 6/1998 Friedman ................... 428/500
6,184,297 B1 * 2/2001 Takahashi et al. .......... 525/240

* cited by examiner

Primary Examiner—Nathan M. Nutter

(57) ABSTRACT

The present invention provides a packaging film which exhibits excellent mechanical strength properties such as high dart impact strength with retaining properties of transparency and film surface smoothness. The ethylene resin packaging film comprises an ethylene/α-olefin copolymer having the following properties: the density is in the range of 0.918 to 0.935 g/cm$^3$; the melt flow rate (MFR) at 190° C. under a load of 2.16 kg is in the range of 0.05 to 1.0 g/10 min; the decane-soluble component fraction (W) at room temperature and the density (d) satisfy the relation W<80×exp(−100(d−0.88))+0.1; the flow index (FI), which is defined as a shear rate at which the shear stress of said copolymer in a molten state at 190° C. reaches 2.4×10$^6$ dyne/cm$^2$, and MFR satisfy the relation FI>75×MFR; and the melt tension (MT) at 190° C. and MFR satisfy the relation MT>2.2×MFR$^{-0.84}$.

8 Claims, No Drawings

ETHYLENE RESIN PACKAGING FILMS

TECHNICAL FIELD

The present invention relates to packaging films made of polyethylene.

BACKGROUND ART

A great number of films have been hitherto produced, and films having properties appropriate for the purpose have been selected and employed. Above all, films produced from linear low-density polyethylene are extensively employed, but they differ from one another in the properties depending upon the type of the monomer units constituting the polyethylene or the type of the process for preparing the polyethylene.

For example, films produced from a linear low-density ethylene/1-butene copolymer have excellent transparency and surface smoothness, but they easily suffer tearing in the molding process because their mechanical strength properties indicated by dart impact strength and Elmendorf tear strength are low, and hence there is a limit of increasing a molding speed.

On the other hand, films produced from linear low-density polyethylene prepared by the use of a metallocene catalyst which has been recently highlighted are known as films hardly suffering blocking because the linear low-density polyethylene has a narrow composition distribution. Especially when a linear low-density ethylene/1-hexene copolymer prepared by the use of a metallocene catalyst is used to produce films, the resulting films exhibit excellent mechanical strength, transparency and heat sealing properties. However, if the melt flow rate (MFR) of the linear low-density ethylene/1-hexene copolymer is low, e.g., not more than 1 g/10 min, melt fracture easily takes place, and as a result, the films have poor surface smoothness.

Accordingly, there is desired development of high-strength packaging films capable of being produced at a high speed with retaining properties inherent in films of linear low-density polyethylene, such as transparency and surface smoothness.

It is an object of the present invention to provide packaging films which exhibit excellent mechanical strength properties such as high dart impact strength with retaining properties inherent in films of linear low-density polyethylene, such as transparency and surface smoothness.

It is another object of the invention to provide films having such excellent low-temperature properties (e.g., low-temperature drop-bag strength properties) that they can be satisfactorily used for heavy-duty packaging bags even in the cold districts having below-zero temperatures.

DISCLOSURE OF THE INVENTION

The first ethylene resin packaging film according to the invention is an ethylene resin packaging film comprising an ethylene/α-olefin copolymer (A) which is a copolymer obtained by copolymerizing ethylene and an α-olefin of 6 to 20 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound, and which has the following properties:

(i) the density is in the range of 0.918 to 0.935 g/cm$^3$,
(ii) the melt flow rate (MFR (g/10 min)) at 190° C. under a load of 2.16 kg is in the range of 0.05 to 2.0 g/10 min,
(iii) the decane-soluble component fraction (W (% by weight) at room temperature and the density (d (g/cm$^3$)) satisfy the following relation
W<80×exp(−100(d−0.88))+0.1,
(iv) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation
FI>75×MFR, and
(v) the melt tension (MT (g)) at 190° C. and the melt flow rate (MFR (g/10 min)) satisfy the following relation
MT>2.2×MFR$^{−0.84}$,
preferably 5.5×MFR$^{−0.65}$>MT>2.2×MFR$^{−0.84}$.

It is preferable that the ethylene/α-olefin copolymer (A) further has the following property:

the mean value (B1) of the numbers of branches on the higher molecular weight side, as determined by GPC-IR, and the mean value (B2) of the numbers of branches on the lower molecular weight side, as determined by GPC-IR, satisfy the following relation
B1≧B2.

The second ethylene resin packaging film according to the invention is an ethylene resin packaging film comprising an ethylene/α-olefin copolymer composition (B) which comprises:

(I) 50 to 99 parts by weight of an ethylene/α-olefin copolymer (a-1), and
(II) 1 to 50 parts by weight of high-density polyethylene (b-1), wherein the ethylene/α-olefin copolymer (a-1) is a copolymer obtained by copolymerizing ethylene and an α-olefin of 6 to 20 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound, and has the following properties:

(i) the density is in the range of 0.900 to 0.935 g/cm$^3$,
(ii) the melt flow rate (MFR (g/10 min)) at 190° C. under a load of 2.16 kg is in the range of 0.01 to 1.0 g/10 min,
(iii) the decane-soluble component fraction (W (% by weight)) at room temperature and the density (d (g/cm$^3$)) satisfy the following relation
W<80×exp(−100(d−0.88))+0.1,
(iv) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation
FI>75×MFR,
(v) the melt tension (MT (g)) at 190° C. and the melt flow rate (MFR (g/10 min)) satisfy the following relation
MT>2.2×MFR$^{−0.84}$,
preferably 5.5×MFR$^{−0.65}$>MT>2.2×MFR$^{−0.84}$, and
(vi) the temperature (Tm (° C.)) at the maximum peak position in an endothermic curve of said copolymer (a-1), as measured by a differential scanning calorimeter (DSC), and the density (d) satisfy the following relation
Tm<400d−250; and the high-density polyethylene (b-1) is ethylene monopolymer or ethylene/α-olefin copolymer obtained by copolymerizing ethylene and an α-olefin of 3 to 20 carbon atoms, which has the following properties:
(i) the density is in the range of 0.935 to 0.975 g/cm³, and
(ii) the melt flow rate (MFR (g/10 min)) at 190° C. under a load of 2.16 kg is in the range of 0.1 to 100 g/10 min.

The ethylene resin packaging films mentioned above preferably have (A) a Young's modulus of not less than 4,000 kg/cm² and (B) a dart impact strength of not less than 55 kg/cm.

The third ethylene resin packaging film according to the invention is an ethylene resin packaging film comprising an ethylene/α-olefin copolymer composition (C) which comprises:
(I) 1 to 50 parts by weight of an ethylene/α-olefin copolymer (a-2), and
(II) 50 to 99 parts by weight of an ethylene copolymer (b-2),
wherein the ethylene/α-olefin copolymer (a-2) is a copolymer obtained by copolymerizing ethylene and an α-olefin of 4 to 12 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound, and has the following properties:
(i) the density is in the range of 0.880 to 0.925 g/cm³,
(ii) the melt flow rate (MFR (g/10 min)) at 190° C. under a load of 2.16 kg is in the range of 0.01 to 5.0 g/10 min,
(iii) the decane-soluble component fraction (W (% by weight)) at room temperature and the density (d (g/cm³)) satisfy the following relation
$W < 80 \times \exp(-100(d-0.88)) + 0.1$,
(iv) the flow index (FI (1/sec)), which is defined as a shear rate at which the shear stress of said copolymer in a molten state at 190° C. reaches $2.4 \times 10^6$ dyne/cm², and the melt flow rate (MFR (g/10 min)) satisfy the following relation
$FI > 75 \times MFR$, and
(v) the melt tension (MT (g)) at 190° C. and the melt flow rate (MFR (g/10 min)) satisfy the following relation
$MT > 2.2 \times MFR^{-0.84}$,
preferably $5.5 \times MFR^{-0.65} > MT > 2.2 \times MFR^{-0.84}$; and
the ethylene copolymer (b-2) is a copolymer obtained by copolymerizing ethylene and an α-olefin of 4 to 10 carbon atoms and has the following properties:
(i) the density is in the range of 0.920 to 0.945 g/cm³,
(ii) the melt flow rate (MFR (g/10 min)) at 190° C. under a load of 2.16 kg is in the range of 0.1 to 10 g/10 min, and
(iii) the ratio of the weight-average molecular weight (Mw) to the number-average molecular weight (Mn), Mw/Mn, is in the range of 3 to 6.

This ethylene resin packaging film preferably has (B) a dart impact strength of not less than 250 kg/cm and (C) an Elmendorf tear strength of not less than 60 kg/cm in the machine direction.

BEST MODE FOR CARRYING OUT THE INVENTION

First Ethylene Resin Packaging Film

The first ethylene resin packaging film according to the invention is made of an ethylene/α-olefin copolymer (A). The ethylene/α-olefin copolymer (A) is described below.

Ethylene/α-olefin Copolymer (A)

The ethylene/α-olefin copolymer (A) for use in the invention comprises ethylene and an α-olefin of 6 to 20 carbon atoms.

Examples of the α-olefins of 6 to 20 carbon atoms include 1-butene, 1-pentene, 1-hexene, 4-methyl-1-pentene, 1-octene, 1-decene and 1-dodecene.

In the ethylene/α-olefin copolymer (A) for use in the invention, the ethylene content is in the range of usually 94 to 99% by mol, preferably 96 to 98% by mol, and the content of the α-olefin that is a comonomer is in the range of usually 1 to 6% by mol, preferably 2 to 4% by mol.

The ethylene/α-olefin copolymer (A) for use in the invention desirably has a density of 0.918 to 0.935 g/cm³, preferably 0.905 to 0.930 g/cm³.

The ethylene/α-olefin copolymer (A) for use in the invention desirably has a melt flow rate (MFR), as measured at 190° C. under a load of 2.16 kg, of 0.05 to 2.0 g/10 min, preferably 0.1 to 2.0 g/10 min.

The ethylene/α-olefin copolymer (A) for use in the invention has the following relation between the decane-soluble component fraction (W (% by weight)) at room temperature and the density (d (g/cm³)):
$W < 80 \times \exp(-100(d-0.88)) + 0.1$,
preferably $W < 60 \times \exp(-100(d-0.88)) + 0.1$.

The ethylene/α-olefin copolymer (A) for use in the invention has the following relation between the flow index (FI (1/sec)), which is defined as a shear rate at which the shear stress of said copolymer in a molten state at 190° C. reaches $2.4 \times 10^6$ dyne/cm², and the melt flow rate (MFR (g/10 min)):
$FI > 75 \times MFR$,
preferably $FI > 80 \times MFR$.

The linear ethylene/α-olefin copolymer (A) for use in the invention has the following relation between the melt tension (MT (g)) at 190° C. and the melt flow rate (MFR (g/10 min)):
$MT > 2.2 \times MFR^{-0.84}$,
preferably $5.5 \times MFR^{-0.65} > MT > 2.2 \times MFR^{-0.84}$,
more preferably $5.5 \times MFR^{-0.65} > MT > 2.5 \times MFR^{-0.84}$.

The ethylene/α-olefin copolymer (A) for use in the invention has the following relation between the mean value (B1) of the numbers of branches on the higher molecular weight side, as determined by GPC-IR, and the mean value (B2) of the numbers of branches on the lower molecular weight side thereof, as determined by GPC-IR:
$B1 \geq B2$.

The mean value (B1) of the numbers of branches on the higher molecular weight side, as determined by GPC-IR, is a mean value of the numbers of branches on the higher molecular weight side out of two divisions of the branch numbers measured within the range of 15 to 85% of the cumulative weight fraction of high-molecular weight eluates fractionated on the molecular weight by GPC (i.e., high-molecular weight eluate component except 15% of the low-molecular weight region and 15% of the high-molecular weight region). The mean value (B2) of the numbers of branches on the lower molecular weight side is a mean value on the lower molecular weight side out of said two divisions.

The conditions for the measurements of B1 and B2 are as follows.

Measuring device: PERKIN ELMER 1760X
Column: TOSOH TSKgel GMMH-HT (7.5 mmI.D.×600 mm)×1
Eluent: o-dichlorobenzene (ODCB) containing 0.05% of MP-J (available from Wako Junyaku Kogyo, extra pure grade)

Column temperature: 140° C.

Sample concentration: 0.1% (weight/volume)

Injection volume: 100 microliters

Detector: MCT

Resolution: 8 cm$^{-1}$

The ethylene/α-olefin copolymer (A) having the above relation between B1 and B2 exhibits a narrow composition distribution and has a low content of the low-molecular weight polymer portion, so that the copolymer (A) hardly suffers stickiness.

The ethylene/α-olefin copolymer (A) can be favorably used for packaging films.

The ethylene/α-olefin copolymer (A) can be prepared by copolymerizing ethylene and an α-olefin of 6 to 20 carbon atoms in the presence of an olefin polymerization catalyst comprising:

(a) a compound of a transition metal of Group IV of the periodic table, which contains a ligand having cyclopentadienyl skeleton, (b) an organoaluminum oxy-compound, (c) a carrier, and optionally (d) an organoaluminum compound, in such a manner that the resulting polymer has a density of 0.918 to 0.935 g/cm$^3$.

The olefin polymerization catalyst and the catalyst components are described below.

(a) Transition Metal Compound

The compound (a) of a transition metal of Group IV of the periodic table, which contains a ligand having cyclopentadienyl skeleton, (sometimes referred to as a "component (a)" hereinafter) is a transition metal compound represented by the following formula (I):

$$ML^1_x \qquad (I)$$

wherein M is a transition metal atom selected from Group IV of the periodic table; $L^1$ is a ligand coordinated to the transition metal atom, at least two ligands $L^1$ are each a substituted cyclopentadienyl group having 2 to 5 substituents selected from methyl and ethyl, and the ligand $L^1$ other than the substituted cyclopentadienyl group is a hydrocarbon group of 1 to 12 carbon atoms, an alkoxy group, an aryloxy group, a halogen atom, a trialkylsilyl group or a hydrogen atom; and x is a valence of the transition metal atom M.

$L^1$ is a ligand coordinated to the transition metal atom M, and at least two ligands $L^1$ are each a substituted cyclopentadienyl group having 2 to 5 substituents selected from methyl group and ethyl group. The ligands may be the same or different. The substituted cyclopentadienyl group is a substituted cyclopentadienyl group having two or more substituents, preferably a substituted cyclopentadienyl group having 2 or 3 substituents, more preferably a di-substituted cyclopentadienyl group, particularly preferably a 1,3-substituted cyclopentadienyl group. The substituents may be the same or different.

In the formula (I), M is a transition metal atom selected from Group IV of the periodic table, specifically zirconium, titanium or hafnium, preferably zirconium.

In the formula (I), the ligand $L^1$ other than the substituted cyclopentadienyl group coordinated to the transition metal atom M is a hydrocarbon group of 1 to 12 carbon atoms, an alkoxy group, an aryloxy group, a halogen atom, a trialkylsilyl group or a hydrogen atom.

Examples of the transition metal compounds represented by the formula (I) include:

bis(cyclopentadienyl)zirconium dichloride,
bis(methylcyclopentadienyl)zirconium dichloride,
bis(ethylcyclopentadienyl)zirconium dichloride,
bis(n-propylcyclopentadienyl)zirconium dichloride,
bis(n-butylcyclopenadienyl)zirconium dichloride,
bis(n-hexylcyclopentadienyl)zirconium dichloride,
bis(methyl-n-propylcyclopentadienyl)zirconium dichloride,
bis(methyl-n-butylcyclopentadienyl)zirconium dichloride,
bis(dimethyl-n-butylcyclopentadienyl)zirconium dichloride,
bis(n-butylcyclopentadienyl)zirconium dibromide,
bis(n-butylcyclopentadienyl)zirconium methoxychloride,
bis(n-butylcyclopentadienyl)zirconium ethoxychloride,
bis(n-butylcyclopentadienyl)zirconium butoxychloride,
bis(n-butylcyclopentadienyl)zirconium ethoxide,
bis(n-butylcyclopentadienyl)zirconium methylchloride,
bis(n-butylcyclopentadienyl)zirconium dimethyl,
bis(n-butylcyclopentadienyl)zirconium benzylchloride,
bis(n-butylcyclopentadienyl)zirconium dibenzyl,
bis(n-butylcyclopentadienyl)zirconium phenylchloride,
bis(n-butylcyclopentadienyl)zirconium hydride chloride,
bis(dimethylcyclopentadienyl)zirconium dichloride,
bis(di-ethylcyclopentadienyl)zirconium dichloride,
bis(methylethylcyclopentadienyl)zirconium dichloride,
bis(dimethylethylcyclopentadienyl)zirconium dichloride,
bis(dimethylcyclopentadienyl)zirconium dibromide,
bis(dimethylcyclopentadienyl)zirconium methoxychloride,
bis(dimethylcyclopentadienyl)zirconium ethoxychloride,
bis(dimethylcyclopentadienyl)zirconium butoxychloride,
bis(dimethylcyclopentadienyl)zirconium diethoxide,
bis(dimethylcyclopentadienyl)zirconium methylchloride,
bis(dimethylcyclopentadienyl)zirconium dimethyl,
bis(dimethylcyclopentadienyl)zirconium benzylchloride,
bis(dimethylcyclopentadienyl)zirconium dibenzyl,
bis(dimethylcyclopentadienyl)zirconium phenylchloride, and
bis(dimethylcyclopentadienyl)zirconium hydride chloride.

In the above examples, the di-substituted cyclopentadienyl rings include 1,2- and 1,3-substituted cyclopentadienyl rings, and the tri-substituted cyclopentadienyl rings include 1,2,3- and 1,2,4-substituted cyclopentadienyl rings. In the present invention, transition metal compounds wherein a zirconium metal is replaced with a titanium metal or a hafnium metal in the above-mentioned zirconium compounds are also employable.

Of the above transition metal compounds represented by the formula (I), particularly preferable are:

bis(n-propylcyclopentadienyl)zirconium dichloride,
bis(n-butylcyclopentadienyl)zirconium dichloride,
bis(1-methyl-3-n-propylcyclopentadienyl)zirconium dichloride,
bis(1-methyl-3-n-butylcyclopentadienyl)zirconium dichloride,
bis(1,3-dimethylcyclopentadienyl)zirconium dichloride,
bis(1,3-diethylcyclopentadienyl)zirconium dichloride, and
bis(1-methyl-3-ethylcyclopentadienyl)zirconium dichloride.

The transition metal compound for use in the invention may be a mixture of two or more kinds of the transition metal compounds represented by the formula (I).

Specifically, there can be mentioned a combination of bis(1,3-n-butylmethylcyclopentadienyl)zirconium dichloride and bis(1,3-dimethylcyclopentadienyl)zirconium dichloride, a combination of bis(1,3-n-propylmethylcyclopentadienyl)zirconium dichloride and bis(1,3-dimethylcyclopentadienyl)zirconium dichloride, and a combination of bis(n-butylcyclopentadienyl)zirconium dichloride and bis(1,3-dimethylcyclopentadienyl)zirconium dichloride.

The transition metal compound for use in the invention may be a mixture of the transition metal compound represented by the formula (I) and a transition metal compound represented by the following formula (II):

$$MKL^2_{x-2} \tag{II}$$

wherein M is a transition metal atom selected from Group IV of the periodic table; K and $L^2$ are each a ligand coordinated to the transition metal atom, the ligand K is a bidentate ligand wherein the same or different groups selected from an indenyl group, a substituted indenyl group and their partially hydrogenated products are linked through a lower alkylene group, and the ligand $L^2$ is a hydrocarbon group of 1 to 12 carbon atoms, an alkoxy group, an aryloxy group, a halogen atom, a trialkylsilyl group or a hydrogen atom; and x is a valence of the transition metal atom M.

Examples of the transition metal compounds represented by the formula (II) include:

ethylenebis(indenyl)zirconium dichloride, ethylenebis(4-methyl-1-indenyl)zirconium dichloride, and ethylenebis(4,5,6,7-tetrahydro-1-indenyl)zirconium dichloride.

In the present invention, it is preferable to use, as the transition metal compound (a), a combination of at least one compound selected from the transition metal compounds represented by the formula (I) and at least one compound selected from the transition metal compounds represented by the formula (II).

It is desirable that at least one compound selected from the transition metal compounds (a-1) represented by the formula (I) and at least one compound selected from the transition metal compounds (a-2) represented by the formula (II) are used in such amounts that the molar ratio of (a-1)/(a-2) becomes 99/1 to 50/50, preferably 97/3 to 70/30, more preferably 95/5 to 75/25, most preferably 90/10 to 80/20.

(b) Organoaluminum Oxy-compound

The organoaluminum oxy-compound (b) is described below.

The organoaluminum oxy-compound (b) (sometimes referred to as a "component (b)" hereinafter) for use in the invention may be benzene-soluble aluminoxane hitherto known or such a benzene-insoluble organoaluminum oxy-compound as disclosed in Japanese Patent Laid-Open Publication No. 276807/1990.

The aluminoxane can be prepared by, for example, the following processes.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to react with them, and the aluminoxane is recovered as a hydrocarbon solution.

(2) Water, ice or water vapor is allowed to directly act on an organoaluminum compound such as trialkylaluminum in a medium such as benzene, toluene, ethyl ether or tetrahydrofuran, and the aluminoxane is recovered as a hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. It is possible that the solvent or the unreacted organoaluminum compound is distilled off from the recovered solution of aluminoxane and the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-secbutylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, trialkylaluminums and trialkylaluminums are particularly preferable.

Also employable as the organoaluminum compound is isoprenylaluminum represented by the following formula:

$$(i\text{-}C_4H_9)_xAl_y(C_5H_{10})_z$$

wherein x, y, z are each a positive number, and $z \geq 2x$.

The organoaluminum compounds mentioned above are used singly or in combination.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Also employable are ethers such as ethyl ether and tetrahydrofuran. Of the solvents, aromatic hydrocarbons are particularly preferable.

The benzene-insoluble organoaluminum oxy-compound contains not more than 10% (in terms of Al atom), preferably not more than 5%, particularly preferably not more than 2%, of an Al component that is soluble in benzene at 60° C., and is insoluble or sparingly soluble in benzene.

The solubility of the organoaluminum oxy-compound in benzene can be determined in the following manner. The organoaluminum oxy-compound in an amount corresponding to 100 m·atom of Al is suspended in 100 ml of benzene, and they are mixed at 60° C. for 6 hours with stirring. Then, the mixture is subjected to hot filtration at 60° C. using a jacketed G-5 glass filter, and the solid separated on the filter is washed four times with 50 ml of benzene at 60° C. to obtain filtrates. The amount (x mmol) of Al atom present in all of the filtrates is measured to determine the solubility (x %).

(c) Carrier

The carrier (c) for use in the invention is an inorganic or organic compound of granular or particulate solid having a particle diameter of 10 to 300 μm, preferably 20 to 200 μm. The inorganic carrier is preferably a porous oxide, and examples thereof include $SiO_2$, $Al_2O_3$, MgO, $ZrO_2$, $TiO_2$, $B_2O_3$, CaO, ZnO, BaO, $ThO_2$, and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are oxides containing at least one component selected from the group consisting of $SiO_2$ and $Al_2O_3$ as their major component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the carriers (c) differ in the properties depending upon the type and the preparation process, the carrier preferably used in the invention desirably has a specific surface area of 50 to 1,000 m²/g, preferably 100 to 700 m²/g, and a pore volume of 0.3 to 2.5 cm³/g. If desired, the carrier is calcined at a temperature of 100 to 1,000° C., preferably 150 to 700° C., prior to use.

Also employable as the carrier in the invention is an organic compound of granular or particulate solid having a particle diameter of 10 to 300 μm. Examples of such organic compounds include (co)polymers produced using an α-olefin of 2 to 14 carbon atoms such as ethylene, propylene, 1-butene or 4-methyl-1-pentene as a main component, and (co)polymers produced using vinylcyclohexane or styrene as a main component.

(d) Organoaluminum Compound

The olefin polymerization catalyst used for preparing the ethylene/α-olefin copolymer for use in the invention is formed from the component (a), the component (b) and the carrier (c), but an organoaluminum compound (d) may be used, if necessary.

The organoaluminum compound (d) (sometimes referred to as a "component (d)" hereinafter) optionally used in the invention is, for example, an organoaluminum compound represented by the following formula (III):

$$R^1{}_n AlX_{3-n} \quad (III)$$

wherein $R^1$ is a hydrocarbon group of 1 to 12 carbon atoms, X is a halogen atom or a hydrogen atom, and n is 1 to 3.

In the formula (III), $R^1$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (d) is a compound represented by the following formula (IV):

$$R^1{}_n AlY_{3-n} \quad (IV)$$

wherein $R^1$ is the same hydrocarbon as indicated by $R^1$ in the formula (III); Y is —$OR^2$ group, —$OSiR^3{}_3$ group, —$OAlR^4{}_2$ group, —$NR^5{}_2$ group, —$SiR^6{}_3$ group or —$N(R^7)AlR^8{}_2$ group; n is 1 to 2; $R^2$, $R^3$, $R^4$ and $R^8$ are each methyl, ethyl, isopropyl, isobutyl, cyclohexyl, phenyl or the like; $R^5$ is hydrogen, methyl, ethyl, isopropyl, phenyl, trimethylsilyl or the like; and $R^6$ and $R^7$ are each methyl, ethyl or the like.

Examples of such organoaluminum compounds include:

(1) compounds represented by $R^1{}_n Al(OR^2)_{3-n}$, such as dimethylaluminum methoxide, diethylaluminum ethoxide and diisobutylaluminum methoxide;

(2) compounds represented by $R^1{}_n Al(OSiR^3{}_3)_{3-n}$, such as $Et_2Al(OSiMe_3)$, $(iso\text{-}Bu)_2Al(OSiMe_3)$ and $(iso\text{-}Bu)_2Al(OSiEt_3)$;

(3) compounds represented by $R^1{}_n Al(OAlR^4{}_2)_{3-n}$, such as $Et_2AlOAlEt_2$ and $(iso\text{-}Bu)_2AlOAl(iso\text{-}Bu)_2$;

(4) compounds represented by $R^1{}_n Al(NR^5{}_2)_{3-n}$, such as $Me_2AlNEt_2$, $Et_2AlNHMe$, $Me_2AlNHEt$, $Et_2AlN(SiMe_3)_2$ and $(iso\text{-}Bu)_2AlN(SiMe_3)_2$;

(5) compounds represented by $R^1{}_n Al(SiR^6{}_3)_{3-n}$, such as $(iso\text{-}Bu)_2AlSiMe_3$; and (6) compounds represented by $R^1{}_n Al(N(R^7)AlR^8{}_2)_{3-n}$, such as $Et_2AlN(Me)AlEt_2$ and $(iso\text{-}Bu)_2AlN(Et)Al(iso\text{-}Bu)_2$.

Of the organoaluminum compounds represented by the formulas (III) and (IV), preferable are compounds represented by the formulas $R^1{}_3Al$, $R^1{}_n Al(OR^2)_{3-n}$ and $R^1{}_n Al(OAlR^4{}_2)_{3-n}$, and particularly preferable are compounds of said formulas wherein $R^1$ to $R^4$ is an isoalkyl group and n is 2.

Process for Preparing Catalyst

In the preparation of the ethylene/α-olefin copolymer (A) for use in the invention, a catalyst prepared by contacting the component (a), the component (b), the carrier (c), and if necessary, the component (d) with one another is employed. Although the components may be contacted in any order, it is preferable to contact the carrier (c) with the component (b), then with the component (a), and then if necessary, with the component (d).

The contact between the components can be carried out in an inert hydrocarbon solvent. Examples of the inert hydrocarbon media used for preparing the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

In the contact between the component (a), the component (b), the carrier (c) and the component (d) optionally used, the component (a) is used in an amount of usually $5 \times 10^{-6}$ to $5 \times 10^{-4}$ mol, preferably $10^{-5}$ to $2 \times 10^{-4}$ mol, based on 1 g of the carrier (c), and the concentration of the component (a) is in the range of about $10^{-4}$ to $2 \times 10^{-2}$ mol/liter, preferably $2 \times 10^{-4}$ to $10^{-2}$ mol/liter. The atomic ratio (Al/transition metal) of aluminum (Al) in the component (b) to the transition metal in the component (a) is in the range of usually 10 to 500, preferably 20 to 200. The atomic ratio (Al-d/Al-b) of an aluminum atom (Al-d) in the component (d) optionally used to an aluminum atom (Al-b) in the component (b) is in the range of usually 0.02 to 3, preferably 0.05 to 1.5. In the contact between the component (a), the component (b), the carrier (c) and the component (d) optionally used, the mixing temperature is in the range of usually −50 to 150° C., preferably −20 to 120° C., and the contact time is in the range of usually 1 minute to 50 hours, preferably 10 minutes to 25 hours.

In the olefin polymerization catalyst obtained as above, the transition metal atom derived from the component (a) is desirably supported in an amount of $5 \times 10^{-6}$ to $5 \times 10^{-4}$ g·atom, preferably $10^{-5}$ to $2 \times 10^{-4}$ g·atom, based on 1 g of the carrier (c); and the aluminum atom derived from the component (b) and the component (d) is desirably supported in an amount of $10^{-3}$ to $5 \times 10^{-2}$ g·atom, preferably $2 \times 10^{-3}$ to $2 \times 10^{-2}$ g·atom, based on 1 g of the carrier (c).

The catalyst used for preparing the ethylene/α-olefin copolymer (A) may be a prepolymerized catalyst obtained by prepolymerizing an olefin in the presence of the component (a), the component (b), the carrier (c) and the component (d) optionally used. The prepolymerization can be carried out by introducing an olefin into an inert hydrocarbon solvent in the presence of the component (a), the component (b), the carrier (c) and the component (d) optionally used.

Examples of the olefins used in the prepolymerization include ethylene and α-olefins of 3 to 20 carbon atoms, such as propylene, 1-butene, 1-pentene, 4-methyl-1-pentene, 1-hexene, 1-octene, 1-decene, 1-dodecene and 1-tetradecene. Of these, particularly preferable is ethylene or a combination of ethylene and the same α-olefin as used in the polymerization.

In the prepolymerization, the component (a) is used in an amount of usually $10^{-6}$ to $2 \times 10^{-2}$ mol/liter, preferably $5 \times 10^{-5}$ to $10^{-2}$ mol/liter, and the component (a) is used in an amount of $5 \times 10^{-6}$ to $5 \times 10^{-4}$ mol, preferably $10^{-5}$ to $2 \times 10^{-4}$ mol, based on 1 g of the carrier (c). The atomic ratio (Al/transition metal) of aluminum in the component (b) to the transition metal in the component (a) is in the range of usually 10 to 500, preferably 20 to 200. The atomic ratio (Al-d/Al-b) of an aluminum atom (Al-d) in the component (d) optionally used to an aluminum atom (Al-b) in the component (b) is in the range of usually 0.02 to 3, preferably 0.05 to 1.5. The prepolymerization temperature is in the range of usually −20 to 80° C., preferably 0 to 60° C., and the prepolymerization time is in the range of usually 0.5 to 100 hours, preferably about 1 to 50 hours.

The prepolymerized catalyst is prepared by, for example, the following process. The carrier (c) is suspended in an inert hydrocarbon to give a suspension. To the suspension, the organoaluminum oxy-compound (component (b)) is added, and they are reacted for a given period of time. Then, the supernatant liquid is removed, and the resulting solid is resuspended in an inert hydrocarbon. To the system, the transition metal compound (component (a)) is added, and they are reacted for a given period of time. Then, the supernatant liquid is removed to obtain a solid catalyst component. Subsequently, to an inert hydrocarbon containing the organoaluminum compound (component (d)), the solid catalyst component obtained above is added and an olefin is further introduced, whereby a prepolymerized catalyst is obtained.

In the prepolymerization, an olefin polymer is desirably produced in an amount of 0.1 to 500 g, preferably 0.2 to 300 g, more preferably 0.5 to 200 g, based on 1 g of the carrier (c). In the prepolymerized catalyst, the component (a) is desirably supported in an amount of about $5 \times 10^{-6}$ to $5 \times 10^{-4}$ g·atom, preferably $10^{-5}$ to $2 \times 10^{-4}$ g·atom, in terms of the transition metal atom, based on 1 g of the carrier (c); and the aluminum atom derived from the component (b) and the component (d) is desirably supported in such an amount that the molar ratio (Al/M) of the aluminum atom (Al) to the transition metal atom (M) derived from the component (a) becomes 5 to 200, preferably 10 to 150.

The prepolymerization can be carried out by any of batchwise and continuous processes, and can be carried out under reduced pressure, at atmospheric pressure or under pressure. In the prepolymerization, it is desirable that hydrogen is allowed to be present in the system to produce a prepolymer having an intrinsic viscosity (η), as measured in decalin at 135° C., of 0.2 to 7 dl/g, preferably 0.5 to 5 dl/g.

The ethylene/α-olefin copolymer (A) for use in the invention is obtained by copolymerizing ethylene and an α-olefin of 6 to 20 carbon atoms in the presence of the olefin polymerization catalyst or the prepolymerized catalyst described above.

In the present invention, copolymerization of ethylene and an α-olefin is carried out in a gas phase or a liquid phase of slurry. In the slurry polymerization, an inert hydrocarbon may be used as the solvent, or the olefin itself may be used as the solvent.

Examples of the inert hydrocarbon solvents used in the slurry polymerization include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of the inert hydrocarbon media, preferable are aliphatic hydrocarbons, alicyclic hydrocarbons and petroleum fractions.

When the copolymerization is carried out as slurry polymerization or gas phase polymerization, the olefin polymerization catalyst or the prepolymerized catalyst is desirably used in an amount of usually $10^{-8}$ to $10^{-3}$ g·atom/liter, preferably $10^{-7}$ to $10^{-4}$ g·atom/liter, in terms of a concentration of the transition metal atom in the polymerization reaction system.

In the polymerization, an organoaluminum oxycompound similar to the component (b) and/or the organoaluminum compound (d) may be added. In this case, the atomic ratio (Al/M) of an aluminum atom (Al) derived from the organoaluminum oxy-compound and the organoaluminum compound to the transition metal atom (M) derived from the transition metal compound (a) is in the range of 5 to 300, preferably 10 to 200, more preferably 15 to 150.

When the slurry polymerization is conducted, the polymerization temperature is in the range of usually −50 to 100° C., preferably 0 to 90° C. When the gas phase polymerization is conducted, the polymerization temperature is in the range of usually 0 to 120° C., preferably 20 to 100° C.

The polymerization pressure is in the range of usually atmospheric pressure to 100 kg/cm², preferably 2 to 50 kg/cm². The polymerization can be carried out by any of batchwise, semi-continuous and continuous processes, and can be carried out in not only plural stages but also plural stages such as two stages.

It is possible to conduct copolymerization in two or more stages under different conditions using one or plural polymerization reactors.

To the ethylene/α-olefin copolymer (A) for use in the invention, various additives, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, may be optionally added in amounts not detrimental to the objects of the present invention. Further, other polymer compounds may be blended in small amounts without departing from the spirit of the invention.

Second Ethylene Resin Packaging Film

The second ethylene resin packaging film according to the invention is made of an ethylene/α-olefin copolymer composition (B). The ethylene/α-olefin copolymer composition (B) is described below.

Ethylene/α-olefin Copolymer Composition (B)

The ethylene/α-olefin copolymer composition (B) for use in the invention comprises an ethylene/α-olefin copolymer (a-1) and high-density polyethylene (b-1).

In the ethylene/α-olefin copolymer composition (B), the ethylene/α-olefin copolymer (a-1) is contained in an amount of 50 to 99 parts by weight, preferably 50 to 90 parts by weight, more preferably 55 to 80 parts by weight, and the high-density polyethylene (b-1) is contained in an amount of 1 to 50 parts by weight, preferably 10 to 50 parts by weight, more preferably 20 to 45 parts by weight.

Similarly to the ethylene/α-olefin copolymer (A), the ethylene/α-olefin copolymer (a-1) is preferably a copolymer obtained by copolymerizing ethylene and an α-olefin of 6 to 20 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound.

The catalyst components are identical with the catalyst components previously described.

The ethyleneIα-olefin copolymer (a-1) desirably has the following properties:

(i) the density is in the range of 0.900 to 0.935 g/cm$^3$, (ii) the melt flow rate (MFR (g/10 min)) at 190° C. under a load of 2.16 kg is in the range of 0.01 to 1.0 g/10 min, (iii) the decane-soluble component fraction (W (% by weight)) at room temperature and the density (d (g/cm$^3$)) satisfy the following relation W<80×exp(−100(d−0.88))+0.1, (iv) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation

FI>75×MFR, (v) the melt tension (MT (g)) at 190° C. and the melt flow rate (MFR (g/10 min)) satisfy the following relation

MT>2.2×MFR$^{-0.84}$, preferably 5.5×MFR$^{-0.65}$>MT>2.2×MFR$^{-0.84}$, and the temperature (Tm (° C.)) at the maximum peak position in an endothermic curve of said copolymer (a-1), as measured by a differential scanning calorimeter (DSC), and the density (d) satisfy the following relation Tm<400d−250.

Next, the high-density polyethylene (b-1) is described.

The high-density polyethylene (b-1) is a homopolymer of ethylene or a copolymer of ethylene and an α-olefin of 3 to 20 carbon atoms.

The high-density polyethylene (b-1) desirably has a density of 0.935 to 0.975 g/cm$^3$, preferably 0.935 to 0.965 g/cm$^3$.

The high-density polyethylene (b-1) desirably has a melt flow rate (MFR (g/10 min)), as measured at 190° C. under a load of 2.16 kg, of 0.1 to 100 g/10 min, preferably 0.5 to 80 g/10 min.

For preparing the high-density polyethylene (b-1), any of known polymerization processes is employable, as far as the resulting polyethylene has the above properties. The high-density polyethylene (b-1) is preferably one prepared by the use of a titanium catalyst component or a metallocene catalyst component.

The ethylene/α-olefin copolymer composition (B) for use in the invention can be prepared by known processes, for example, the following processes.

(1) The ethylene/α-olefin copolymer (a-1), the copolymer (b-1) and other components optionally used are mechanically blended using an extruder, a kneader or the like.

(2) The ethylene/α-olefin copolymer (a-1), the copolymer (b-1) and other components optionally used are dissolved in an appropriate good solvent (e.g., hydrocarbon solvent, such as hexane, heptane, decane, cyclohexane, benzene, toluene or xylene), and the solvent is then removed.

(3) The ethylene/α-olefin copolymer (a-1), the copolymer (b-1) and other components optionally used are each dissolved in an appropriate good solvent to prepare solutions, then the solutions are mixed, and the solvents are removed.

(4) The processes (1) to (3) are carried out in combination.

Other than the above-mentioned processes, the following processes can be used to prepare the ethylene/α-olefin copolymer composition (B).

Using one polymerization reactor, the polymerization is conducted in two or more stages under different conditions to prepare the ethylene/α-olefin copolymer (a-1) and the copolymer (b-1). More specifically, in a two-stage polymerization process, the ethylene/α-olefin copolymer (a-1) is produced in the former stage and the copolymer (b-1) is produced in the latter stage, or the copolymer (b-1) is produced in the former stage and the ethylene/α-olefin copolymer (a-1) is produced in the latter stage, whereby the composition (B) can be prepared.

Otherwise, using plural polymerization reactors, the ethylene/α-olefin copolymer (a-1) is produced in one reactor and the copolymer (b-1) is then produced in another reactor in the presence of the ethylene/α-olefin copolymer (a-1), or the copolymer (b-1) is produced in one reactor and the ethylene/α-olefin copolymer (a-1) is then produced in another reactor in the presence of the copolymer (b-1), whereby the composition (B) can be prepared.

The ethylene/α-olefin copolymer composition (B) can be favorably used for packaging films.

To the ethylene/α-olefin copolymer composition (B) for use in the invention, various additives, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, may be optionally added in amounts not detrimental to the objects of the present invention. Further, other polymer compounds may be blended in small amounts without departing from the spirit of the invention.

Third Ethylene Resin Packaging Film

The third ethylene resin packaging film according to the invention is made of an ethylene/α-olefin copolymer composition (C). The ethylene/α-olefin copolymer composition (C) is described below.

Ethylene/α-olefin Copolymer Composition (C)

The ethylene/α-olefin copolymer composition (C) for use in the invention comprises an ethylene/α-olefin copolymer (a-2) and an ethylene copolymer (b-2).

In the ethylene/α-olefin copolymer composition (C), the ethylene/α-olefin copolymer (a-2) is contained in an amount of 1 to 50 parts by weight, preferably 3 to 40 parts by weight, more preferably 5 to 35 parts by weight, and the ethylene copolymer (b-2) is contained in an amount of 50 to 99 parts by weight, preferably 60 to 97 parts by weight, more preferably 65 to 95 parts by weight.

The ethylene/α-olefin copolymer (a-2) is preferably a copolymer obtained by copolymerizing ethylene and an α-olefin of 4 to 12 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound.

The catalyst components are identical with the catalyst components previously described.

The ethylene/α-olefin copolymer (a-2) desirably has the following properties:

(i) the density is in the range of 0.880 to 0.925 g/cm$^3$, (ii) the melt flow rate (MFR (g/10 min)) at 190° C. under a load of 2.16 kg is in the range of 0.01 to 5.0 g/10 min, (iii) the decane-soluble component fraction (W (% by weight)) at room temperature and the density (d (g/cm$^3$)) satisfy the following relation
W<80×exp(−100(d−0.88))+0.1, (iv) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation
FI>75×MFR, and (v) the melt tension (MT (g)) at 190° C. and the melt flow rate (MFR (g/10 min)) satisfy the following relation
MT>2.2×MFR$^{-0.84}$,
preferably 5.5×MFR$^{-0.65}$>MT>2.2×MFR$^{-0.84}$.

Next, the ethylene copolymer (b-2) is described.

The ethylene copolymer (b-2) is a copolymer obtained by copolymerizing ethylene and an α-olefin of 4 to 10 carbon atoms.

The ethylene copolymer (b-2) desirably has a density of 0.920 to 0.945 g/cm$^3$, preferably 0.920 to 0.935 g/cm$^3$.

The ethylene copolymer (b-2) desirably has a melt flow rate (MFR (g/10 min)), as measured at 190° C. under a load of 2.16 kg, of 0.1 to 10 g/10 min, preferably 0.1 to 8 g/10 min.

The ethylene copolymer (b-2) desirably has a ratio of the weight-average molecular weight (Mw) to the number-average molecular weight (Mn), Mw/Mn, ranging from 3 to 6.

For preparing the high-density polyethylene (b-2), any of known polymerization processes is employable, as far as the resulting copolymer has the above properties. The ethylene copolymer (b-2) is preferably one prepared by the use of a titanium catalyst component.

The ethylene/α-olefin copolymer composition (C) for use in the invention can be prepared by known processes, for example, the aforesaid processes.

The ethylene/α-olefin copolymer composition (C) can be favorably used for packaging films.

Ethylene Resin Packaging Film

The first ethylene resin packaging film according to the invention can be produced by feeding the ethylene/α-olefin copolymer (A) to an inflation film molding machine or an extrusion molding machine equipped with a T-die.

The second ethylene resin packaging film according to the invention can be produced by feeding the ethylene/α-olefin copolymer composition (B) to an inflation film molding machine or an extrusion molding machine equipped with a T-die. In the production of the film of the ethylene/α-olefin copolymer composition (B), the components in the form of pellets may be mixed and then directly fed to the extrusion molding machine, or the components may be mixed by means of a commonly used mixing machine such as a Henschel mixer, a tumbling mixer, a single-screw extruder or a twin-screw extruder and then fed to the extrusion molding machine for film production.

The first and the second ethylene resin packaging films have a Young's modulus, as measured in accordance with JIS K 6781, of not less than 4,000 kg/cm$^2$, preferably 4,000 to 10,000 kg/cm$^2$, a dart impact strength, as measured in accordance with the method A of ASTM D 1709, of not less than 55 kg/cm, preferably 55 to 150 kg/cm, and a film thickness of usually 30 to 200 μm.

The first and the second ethylene resin packaging films can be satisfactorily used for heavy-duty packaging bags even in the cold districts having below-zero temperatures. These ethylene resin packaging films have excellent low-temperature properties, so that the film thickness can be made smaller and high-speed film molding is feasible.

The third ethylene resin packaging film according to the invention is a film produced by air-cooling inflation of the ethylene/α-olefin copolymer composition (C).

The third ethylene resin packaging film has Young's modulus, as measured in accordance with JIS K 6781, of not less than 250 kg/cm$^2$, preferably 250 to 1,000 kg/cm$^2$, an Elmendorf tear strength in the machine direction, as measured by a tear test in accordance with ASTM D-1922, of not less than 55 kg/cm, preferably 55 to 150 kg/cm, and a film thickness of usually about 10 to 100 μm.

The third ethylene resin packaging film exhibits excellent mechanical strength properties such as high dart impact strength and Elmendorf tear strength with retaining properties inherent in films of linear low-density polyethylene, such as transparency and surface smoothness. In addition, high-speed film molding is feasible.

EFFECT OF THE INVENTION

The packaging films of the present invention retain properties inherent in films of linear low-density polyethylene, such as transparency and surface smoothness.

Moreover, the films of the invention exhibit excellent mechanical strength properties such as high dart impact strength with retaining properties inherent in films of linear low-density polyethylene, such as transparency and surface smoothness. Further, high-speed film molding is feasible. Therefore, thin films having such excellent properties can be produced with high productivity.

From the resin composition for the films of the invention, which exerts the above effects, single-layer films can be produced, and besides multi-layer films can be also produced by laminating the composition with other films such as films of polyester and polyamide. These films are suitable for packaging foods, office supplies, furniture, toys, electrical equipment, machine parts and the like.

The ethylene resin packaging films of the invention can be satisfactorily used for heavy-duty packaging bags even in the cold districts having below-zero temperatures.

EXAMPLE

The present invention is further described with reference to the following examples, but it should be construed that the invention is in no way limited to those examples.

Properties of films and bags produced in the examples and the comparative examples were measured by the following methods.

(1) Young's Modulus

The film was subjected to a tensile test in MD and TD using a tensile tester of constant-crosshead speed type (manufactured by Instron Co.).

Test Conditions

Sample: JIS K 6781

Surrounding temperature: 23° C.

Pulling rate: 500 mm/min

Chart rate: 200 mm/min

Using the chart obtained by the above test, Young's moduli of the film in MD and TD were calculated from the following formula, and an average of the obtained values was taken as a Young's modulus (E) of the film.

$$E_0 = R_0(L_0/A)$$

wherein $E_0$ is a Young's modulus in each direction, $R_0$ is an initial tangent modulus, $L_0$ is a distance between chucks, and A is a minimum area of the sample just after preparation.

$R_0$ was calculated from the following formula.

$$R_0 = E_1/L_1$$

wherein $F_1$ is a load at an arbitrary point on the initial tangent, and $L_1$ is an elongation corresponding to $F_1$ on the tangent.

(2) Dart Impact Strength

The value measured in accordance with the method A of ASTM D 1709 was divided by the thickness of the film, and the obtained value was taken as the dart impact strength.

(3) Haze

The haze was measured in accordance with JIS K 6714.

(4) Low-temperature Properties (a) Low-temperature drop-bag longitudinal strength test Ten bags, each of which had been allowed to have a content weight of 25 kg and subjected to top- and bottom-sealing by a Newlong HS-33D Top Sealer (trade name, manufactured by Tester Sangyo K.K.) under the conditions of a heater gap of 150% and a cooler gap of 200%, were prepared. The bags with the bottoms down were dropped from a height of 2 m in an atmosphere of −10° C., and the broken bags were counted. The test was carried out in the same manner as described above, except that the height from which the bags were dropped was changed to 1.75 m, 1.5 m or 1 m.

(b) Low-temperature drop-bag transverse strength test

Ten bags, each of which had been allowed to have a content weight of 25 kg and subjected to top- and bottom-sealing by a Newlong HS-33D Top Sealer (trade name, manufactured by Tester Sangyo K.K.) under the conditions of a heater gap of 150% and a cooler gap of 200%, were prepared. The bags with the sides down were dropped from a height of 2 m in an atmosphere of −20° C., and the broken bags were counted. The test was carried out in the same manner as described above, except that the height from which the bags were dropped was changed to 1.75 m, 1.5 m or 1 m.

(5) Elmendorf Tear Strength

A tear test was carried out in accordance with ASTM D-1922 to measure a tear strength in each of the machine and cross directions.

Preparation Example 1

Preparation of Ethylene/α-olefin Copolymer (A-1)

Preparation of Catalyst

In 154 liters of toluene, 10 kg of silica having been dried at 250° C. for 10 hours was suspended, and the suspension was cooled to 0° C. To the suspension, 57.5 liters of a toluene solution of methylaluminoxane (Al=1.33 mol/l) was dropwise added over a period of 1 hour. During the addition, the temperature of the system was maintained at 0° C. The reaction was successively conducted at 0° C. for 30 minutes, then the temperature of the system was raised up to 95° C. over a period of 1.5 hours, and at that temperature, the reaction was conducted for 20 hours. Thereafter, the temperature of the system was lowered to 60° C., and the supernatant liquid was removed by decantation. The resulting solid component was washed twice with toluene and then resuspended in 100 liters of toluene. To the system, 16.8 liters of a toluene solution of bis(1,3-dimethylcyclopentadienyl)zirconium dichloride (Zr=27.0 mmol/l) was dropwise added at 80° C. over a period of 30 minutes, and the reaction was further conducted at 80° C. for 2 hours. Then, the supernatant liquid was removed, and the remainder was washed twice with hexane to obtain a solid catalyst containing 3.5 mg of zirconium per gram of the solid catalyst.

Preparation of Prepolymerized Catalyst

To 87 liters of hexane containing 2.5 mol of triisobutylaluminum, 870 g of the solid catalyst obtained above and 260 g of 1-hexene were added, and prepolymerization of ethylene was carried out at 35° C. for 5 hours to obtain a prepolymerized catalyst wherein polyethylene had been produced by prepolymerization in an amount of 10 g per gram of the solid catalyst.

Polymerization

In a continuous type fluidized bed gas phase polymerization apparatus, copolymerization of ethylene and 1-hexene was carried out at a polymerization temperature of 80° C. under a total pressure of 20 kg/cm²-G. To the system were continuously fed the prepolymerized catalyst prepared above at a rate of 0.33 mmol/hr in terms of a zirconium atom and triisobutylaluminum at a rate of 10 mmol/hr. During the polymerization, ethylene, 1-hexene, hydrogen and nitrogen were continuously fed to maintain the gas composition constant (gas composition: 1-hexene/ethylene=0.02, hydrogen/ethylene=10.5×10$^{-4}$, ethylene concentration= 70%). The yield of polyethylene (A-1) obtained was 60 kg/hr. This polyethylene had a density of 0.925 g/cm$^3$ and MFR of 0.3 g/10 min.

The properties of the ethylene/α-olefin copolymer (A-1) are set forth in Table 1.

Example 1

Preparation of Film

The ethylene/α-olefin copolymer (A-1) obtained in Preparation Example 1 was pelletized by an extruder, and the pellets were subjected to air-cooling inflation under the following molding conditions to prepare a film having a thickness of 150 μm and a width of 450 mm.

Molding Conditions

Molding machine: inflation molding machine having a diameter of 90 mm, manufactured by Modern Machinery K.K. (for high-pressure low-density polyethylene resin)

Screw: L/D=28, C·R=2.8, equipped with intermediate mixing part

Die: 200 mm in diameter, 2.5 mm in lip width Air ring: two-gap type

Molding temperature: 190° C.

Take-off rate: 20 m/min

The film obtained above was evaluated on the Young's modulus, dart impact strength and low-temperature properties of bags in accordance with the aforesaid methods.

The results are set forth in Table 2.

Preparation Example 2

Preparation of Ethylene/α-olefin Copolymer Composition (A-4)

Ethylene/α-olefin copolymers (A-2) and (A-3) were each prepared in the same manner as in Preparation Example 1, except that the polymerization was so conducted that the resulting copolymer had a density and MFR shown in Table 1.

Preparation of Composition

The ethylene/α-olefin copolymers (A-2) and (A-3) obtained in Preparation Example 2 were melt kneaded in a weight ratio of 60/40 ((A-2)/(A-3)) to obtain an ethylene/α-olefin copolymer composition (A-4). The properties of the ethylene/α-olefin copolymers (A-2), (A-3) and composition (A-4) are set forth in Table 1.

Example 2

The ethylene/α-olefin copolymer composition (A-4) obtained in Preparation Example 2 was subjected to air-cooling inflation under the same molding conditions as in Example 1 to prepare a film having a thickness of 150 μm and a width of 450 mm. The film was evaluated on the Young's modulus, dart impact strength and low-temperature properties of bags.

The results are set forth in Table 2.

Preparation Example 3

Preparation of Ethylene/α-olefin Copolymer (A-5)

An ethylene/α-olefin copolymer (A-5) was prepared in the same manner as in Preparation Example 1, except that, in the preparation of catalyst component, 4 liters of a toluene solution of bis(1,3-n-butylmethylcyclopentadienyl) zirconium dichloride (Zr=34.0 mmol/l) and 2 liters of a toluene solution of bis(1,3-dimethylcyclopentadienyl) zirconium dichloride (Zr=28.4 mmol/l) were used in place of the toluene solution of bis(1,3-dimethylcyclopentadienyl) zirconium dichloride and the polymerization was so conducted that the resulting copolymer had a density and MFR shown in Table 1.

Example 3

The ethylene/α-olefin copolymer (A-5) obtained in Preparation Example 3 was subjected to air-cooling inflation under the same molding conditions as in Example 1 to prepare a film having a thickness of 150 μm and a width of 450 mm. The film was evaluated on the Young's modulus, dart impact strength and low-temperature properties of bags.

The results are set forth in Table 2.

Preparation Example 4

Preparation of Ethylene/α-olefin Copolymer Composition (A-6)

An ethylene/α-olefin copolymer (a-6) (density: 0.915 g/cm$^3$) and an ethylene/α-olefin copolymer (b-6) (density: 0.933 g/cm$^3$) were each prepared in the same manner as in Preparation Example 1, except that a titanium catalyst component described in Japanese Patent Publication No. 54289/1988 was used in place of bis(1.3-dimethylcyclopentadienyl)zirconium dichloride and triethylaluminum was used in place of methylaluminoxane. The ethyleneα-olefin copolymers (a-6) and (b-6) were melt kneaded in a weight ratio of 60/40 ((a-6)/(b-6)) to obtain an ethylene/α-olefin copolymer composition (A-6).

The properties of the ethylene/α-olefin copolymer composition (A-6) are set forth in Table 1.

Comparative Example 1

The ethylene/α-olefin copolymer composition (A-6) obtained in Preparation Example 4 was subjected to air-cooling inflation under the same molding conditions as in Example 1 to prepare a film having a thickness of 150 μm and a width of 450 mm. The film was evaluated on the Young's modulus, dart impact strength and low-temperature properties of bags.

The results are set forth in Table 2.

TABLE 1

| Co-polymer | Comonomer Type | Content mol % | MFR g/10 min | (η) dl/g | Density g/cm³ | n-decane soluble part wt % | *1 | Tm °C. | MT g | *2 | *3 | FI S⁻¹ | *4 | B1/B2 |
|---|---|---|---|---|---|---|---|---|---|---|---|---|---|---|
| A-1 | 1-hexene | 2.5 | 0.30 | 1.90 | 0.925 | 0.20 | 0.99 | 117.0 | 7.0 | 6.0 | 12.0 | 85 | 23 | |
| A-2 | 1-hexene | 3.8 | 0.05 | 2.48 | 0.910 | 0.50 | 4.00 | 112.5 | 30 | 27 | 38.6 | 19 | 4 | |
| A-3 | 1-hexene | 1.0 | 30 | 0.95 | 0.948 | — | — | 127.1 | — | — | — | 2340 | — | 1.3 |
| A-4 | | | 0.38 | — | 0.925 | 0.29 | 0.99 | — | 7.5 | 5.0 | 10.3 | 150 | 29 | |
| A-5 | 1-hexene | 2.5 | 0.35 | 2.15 | 0.926 | 0.19 | 0.90 | 117.3 | 7.1 | 5.3 | 10.9 | 44 | 26 | |
| A-6 | 1-hexene | 3.2 | 0.30 | 2.28 | 0.925 | 6.44 | 0.99 | 124.5 | 3.8 | 6.0 | 12.0 | 100 | 23 | |

*1: Value of $80 \times \exp(-100(d - 0.88)) + 0.1$
*2: Value of $2.2 \times MFR^{0.94}$
*3: Value of $5.5 \times MFR^{0.65}$
*4: Value of $75 \times MFR$

TABLE 2

| | Copolymer | Moldability *5 | Young's modulus kg/cm² | Dart impact Strength kg/cm | Low temperature drop-bag strength test (−10° C.) *6 | | | |
|---|---|---|---|---|---|---|---|---|
| | | | | | 2.0 m *7 | 1.75 m | 1.5 m | 1.0 m |
| Exam. 1 | A-1 | ○ | 4500 | 80 | 1 | 0 | 0 | 0 |
| Exam. 2 | A-4 | ○ | 4600 | 95 | 0 | 0 | 0 | 0 |
| Exam. 3 | A-5 | ○ | 4600 | 82 | 0 | 0 | 0 | 0 |
| Compar. Exam. 1 | A-6 | x | 4200 | 53 | 5 | 5 | 5 | 3 |

*5: Moldability (Bubble stability) ○: good  x: bad
*6: Each value in the table indicates the number of broken bags.
*7: height from which bags were dropped.

Preparation Example 5

Preparation of Ethylene/α-olefin Copolymer (A-7)

An ethylene/α-olefin copolymer (A-7) was prepared in the same manner as in Preparation Example 1, except that the polymerization was so conducted that the resulting copolymer had a density and MFR shown in Table 3.

The properties of the ethylene/α-olefin copolymer (A-7) are set forth in Table 3.

Example 4

An ethylene/1-butene random copolymer (B-1) having a 1-butene content of 3.3% by mol was prepared as the component (b-2) for constituting an ethylene/α-olefin copolymer composition. The properties of the ethylene/α-olefin copolymer (B-1) are set forth in Table 4.

The ethylene/α-olefin copolymer (A-7) obtained in Preparation Example 5 was pelletized by an extruder, and the pellets of the ethylene/α-olefin copolymer (A-7) and the component (b-2) were melt kneaded in a mixing ratio shown in Table 4. Then, the kneadate was subjected to air-cooling inflation under the following molding conditions to prepare a film having a thickness of 30 μm.
Molding Conditions
  Screw: L/D=2.8, C·R=2.8, equipped with intermediate mixing part
  Die: 200 mm in diameter, 2.5 mm in lip width
  Air ring: two-gap type
  Molding temperature: 190° C.
  Take-off rate: 20 m/min The film obtained above was evaluated on the haze, dart impact strength and Elmendorf tear strength in accordance with the aforesaid methods, and was further evaluated on the surface smoothness through observation with the naked eye.

The results are set forth in Table 4.

Preparation Example 6

Preparation of Ethylene/α-olefin Copolymer (A-8)

An ethylene/α-olefin copolymer (A-8) was prepared in the same manner as in Preparation Example 1, except that the polymerization was so conducted that the resulting copolymer had a density and MFR shown in Table 3.

The properties of the ethylene/α-olefin copolymer (A-8) are set forth in Table 3.

Example 5

The ethylene/α-olefin copolymer (A-8) (component (a-2)) obtained in Preparation Example 6 was pelletized by an extruder, and the pellets of the ethylene/α-olefin copolymer (A-8) and the component (b-2) were melt kneaded in a mixing ratio shown in Table 4. Then, the kneadate was subjected to air-cooling inflation under the same molding conditions as in Example 4 to prepare a film having a thickness of 30 μm. The film was evaluated on the haze, dart impact strength and Elmendorf tear strength in accordance with the aforesaid methods, and was further evaluated on the surface smoothness through observation with the naked eye.

The results are set forth in Table 4.

Example 6

The ethylene/α-olefin copolymer (A-8) obtained in Preparation Example 6 and the component (b-2) were melt kneaded in a mixing ratio shown in Table 4. Then, the kneadate was subjected to air-cooling inflation under the same molding conditions as in Example 4 to prepare a film having a thickness of 30 μm. The film was evaluated on the haze, dart impact strength and Elmendorf tear strength in accordance with the aforesaid methods, and was further evaluated on the surface smoothness through observation with the naked eye.

The results are set forth in Table 4.

Preparation Example 7
Preparation of Ethylene/α-olefin Copolymer (A-9)

A polymerization catalyst was prepared in the same manner as in the preparation of catalyst component in Example 1, except that 3.2 liters of a toluene solution of bis(1,3-dimethylcyclopentadienyl)zirconium dichloride (Zr=28.1 mmol/l) and 10.7 liters of a toluene solution of bis(1,3-n-butylmethylcyclopentadienyl)zirconium dichloride (Zr=34.0 mmol/l) were used in place of the toluene solution of bis(1,3-dimethylcyclopentadienyl)zirconium dichloride.
Polymerization An ethylene/α-olefin copolymer (A-9) was prepared in the same manner as in Preparation Example 1, except that the polymerization was so conducted using the polymerization catalyst obtained above that the resulting copolymer had a density and MFR shown in Table 3.

The properties of the ethylene/α-olefin copolymer (A-9) are set forth in Table 3.

Example 7

The ethylene/α-olefin copolymer (A-9) obtained in Preparation Example 7 was pelletized by an extruder, and the pellets of the ethylene/α-olefin copolymer (A-9) and the component (b-2) were melt kneaded in a mixing ratio shown in Table 4. Then, the kneadate was subjected to air-cooling inflation under the same molding conditions as in Example 4 to prepare a film having a thickness of 30 μm. The film was evaluated on the haze, dart impact strength and Elmendorf tear strength in accordance with the aforesaid methods, and was further evaluated on the surface smoothness through observation with the naked eye.

The results are set forth in Table 4.

Comparative Example 2

The ethylene/1-butene random copolymer (component (b-2)) was subjected to air-cooling inflation under the same molding conditions as in Example 4 to prepare a film having a thickness of 30 μm. The film was evaluated on the haze, dart impact strength and Elmendorf tear strength in accordance with the aforesaid methods, and was further evaluated on the surface smoothness through observation with the naked eye.

The results are set forth in Table 4.

Preparation Example 8

An ethylene/α-olefin copolymer (A-10) was prepared in the same manner as in Preparation Example 1, except that a titanium catalyst component described in Japanese Patent Publication No. 54289/1988 was used in place of bis(1.3-dimethylcyclopentadienyl)zirconium dichloride, triethylaluminum was used in place of methylaluminoxane, and the comonomer content was varied as shown in Table 3. The properties of the ethylene/α-olefin copolymer (A-10) are set forth in Table 3.

Comparative Example 3

The ethylene/α-olefin copolymer (A-10) obtained in Preparation Example 8 was pelletized by an extruder, and the pellets of the ethylene/α-olefin copolymer (A-10) and the component (b-2) were melt kneaded in a mixing ratio shown in Table 4. Then, the kneadate was subjected to air-cooling inflation under the same molding conditions as in Example 4 to prepare a film having a thickness of 30 μm. The film was evaluated on the haze, dart impact strength and Elmendorf tear strength in accordance with the aforesaid methods, and was further evaluated on the surface smoothness through observation with the naked eye.

The results are set forth in Table 4.

TABLE 3

| | | Comonomer | | | | | | n-decane | | | | | | | |
|---|---|---|---|---|---|---|---|---|---|---|---|---|---|---|---|
| | Code | Type | Content mol % | MFR g/10 min | (η) dl/g | Mw/Mn — | Density g/cm$^3$ | soluble part wt % | *1 | Tm °C. | MT g | *2 | *3 | FI S$^{-1}$ | *4 |
| Ex. 5 | A-7 | 1-hexene | 3.2 | 0.13 | 2.15 | — | 0.915 | 0.19 | 2.52 | 113.8 | 13.3 | 12.2 | 20.7 | 40 | 10 |
| Ex. 6 | A-8 | 1-hexene | 3.9 | 0.24 | 1.96 | — | 0.911 | 0.58 | 3.70 | 112.4 | 8.0 | 7.3 | 13.9 | 67 | 18 |
| Ex. 7 | A-9 | 1-hexene | 4.0 | 0.30 | 2.28 | — | 0.910 | 0.55 | 4.08 | 112.2 | 13.8 | 6.0 | 12.0 | 30 | 23 |
| Ex. 8 | A-10 | 1-hexene | 6.1 | 0.65 | 2.00 | — | 0.915 | 13.5 | 2.52 | 120.3 | 2.8 | 3.2 | 7.3 | 140 | 49 |
| Component (b-2) | B-1 | 1-butene | 3.2 | 1.90 | — | 4.0 | 0.924 | — | — | — | — | — | — | — | — |

*1: Value of 80 × exp(−100(d − 0.88)) + 0.1
*2: Value of 2.2 × MFR$^{0.94}$
*3: Value of 5.5 × MFR$^{0.65}$
*4: Value of 75 × MFR

TABLE 4

| | Component (a-2) | Component (b-2) | Component (a-2)/ Component (b-2) | Moldability *5 | Haze % | Dart Impact strength kg/cm | Elmendorf Tear strength (kg/cm) | |
|---|---|---|---|---|---|---|---|---|
| | | | | | | | Machine direction | Cross direction |
| Ex. 4 | A-7 | B-1 | 20/80 | ○ | 5.5 | 400 | 115 | 184 |
| Ex. 5 | A-8 | B-1 | 20/80 | ○ | 5.3 | 415 | 120 | 190 |

TABLE 4-continued

|  | Component (a-2) | Component (b-2) | Component (a-2)/ Component (b-2) | Moldability *5 | Haze % | Dart Impact strength kg/cm | Elmendorf Tear strength (kg/cm) Machine direction | Cross direction |
|---|---|---|---|---|---|---|---|---|
| Ex. 6 | A-8 | B-1 | 30/70 | o | 5.8 | 430 | 125 | 198 |
| Ex. 7 | A-9 | B-1 | 20/80 | o | 5.2 | 418 | 120 | 198 |
| Com. Ex. 2 | — | B-1 | 0/100 | x | 6.4 | 95 | 34 | 122 |
| Com. Ex. 3 | A-10 | B-1 | 20/80 | x | 7.5 | 220 | 80 | 168 |

*5: Moldability (Bubble stability) o: good  x: bad

What is claimed is:

1. An ethylene resin packaging film comprising an ethylene/α-olefin copolymer (A) which is a copolymer obtained by copolymerizing ethylene and an α-olefin of 6 to 20 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound, and which has the following properties:

(i) the density is in the range of 0.918 to 0.935 g/cm$^3$, (ii) the melt flow rate (MFR (g/10 min)) at 190° C. under a load of 2.16 kg is in the range of 0.05 to 2.0 g/10 min, (iii) the decane-soluble component fraction (W (% by weight) at room temperature and the density (d (g/cm$^3$)) satisfy the following relation W<80×exp(−100(d−0.88))+0.1, (iv) the flow index (FI (l/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation FI>75×MFR, and (v) the melt tension (MT (g)) at 190° C. and the melt flow rate (MFR (g/10 min)) satisfy the following relation

MT>2.2×MFR$^{-0.84}$.

2. The ethylene resin packaging film as claimed in claim 1, wherein the ethylene/α-olefin copolymer (A) further has the following property:

the mean value (B1) of the numbers of branches on the higher molecular weight side, as determined by GPC-IR, and the mean value (B2) of the numbers of branches on the lower molecular weight side, as determined by GPC-IR, satisfy the following relation

B1≧B2.

3. An ethylene resin packaging film comprising an ethylene/α-olefin copolymer composition (B) which comprises:

(I) 50 to 99 parts by weight of an ethylene/α-olefin copolymer (a-1), and (II) 1 to 50 parts by weight of high-density polyethylene (b-1), wherein the ethylene/α-olefin copolymer (a-1) is a copolymer obtained by copolymerizing ethylene and an α-olefin of 6 to 20 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound, and has the following properties:

(i) the density is in the range of 0.900 to 0.935 g/cm$^3$, (ii) the melt flow rate (MFR (g/10 min)) at 190° C. under a load of 2.16 kg is in the range of 0.01 to 1.0 g/10 min, (iii) the decane-soluble component fraction (W (% by weight)) at room temperature and the density (d (g/cm$^3$)) satisfy the following relation W<80×exp(−100(d−0.88))+0.1, (iv) the flow index (FI (l/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation

FI>75×MFR, (v) the melt tension (MT (g)) at 190° C. and the melt flow rate (MFR (g/10 min)) satisfy the following relation MT>2.2×MFR$^{-0.84}$, and (vi) the temperature (Tm (° C.)) at the maximum peak position in an endothermic curve of said copolymer (a-1), as measured by a differential scanning calorimeter (DSC), and the density (d) satisfy the following relation Tm<400d−250;

and the high-density polyethylene (b-1) is ethylene homopolymer or ethylene/α-olefin copolymer obtained by copolymerizing ethylene and an α-olefin of 3 to 20 carbon atoms, which has the following properties:

(i) the density is in the range of 0.935 to 0.975 g/cm$^3$, and (ii) the melt flow rate (MFR (g/10 min)) at 190° C. under a load of 2.16 kg is in the range of 0.1 to 100 g/min.

4. An ethylene resin packaging film comprising an ethylene/α-olefin copolymer composition (C) which comprises:

(I) 1 to 50 parts by weight of an ethylene/α-olefin copolymer (a-2), and (II) 50 to 99 parts by weight of an ethylene copolymer (b-2), wherein the ethylene/α-olefin copolymer (a-2) is a copolymer obtained by copolymerizing ethylene and an α-olefin of 4 to 12 carbon atoms in the presence of an olefin polymerization catalyst comprising (a) a compound of a transition metal of Group IV of the periodic table, said compound (a) containing a ligand having cyclopentadienyl skeleton, and (b) an organoaluminum oxy-compound, and has the following properties:

(i) the density is in the range of 0.880 to 0.925 g/cm$^3$, (ii) the melt flow rate (MFR (g/10 min)) at 190° C. under a load of 2.16 kg is in the range of 0.01 to 5.0 g/10 min, (iii) the decane-soluble component fraction (W (% by weight)) at room temperature and the density (d (g/cm$^3$)) satisfy the following relation W<80×exp(−100(d−0.88))+0.1, (iv) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation FI>75×MFR, and (v) the melt tension (MT (g)) at 190° C. and the melt flow rate (MFR (g/10 min)) satisfy the following relation

MT>2.2×MFR$^{-0.84}$;

and the ethylene copolymer (b-2) is a copolymer obtained by copolymerizing ethylene and an α-olefin of 4 to 10 carbon atoms and has the following properties:
(i) the density is in the range of 0.920 to 0.945 g/cm$^3$,
(ii) the melt flow rate (MFR (g/10 min)) at 190° C. under a load of 2.16 kg is in the range of 0.1 to 10 g/10 min, and
(iii) the ratio of the weight-average molecular weight (Mw) to the number-average molecular weight (Mn), Mw/Mn, is in the range of 3 to 6.

5. The ethylene resin packaging film as claimed in claim 4, which has:
(B) a dart impact strength of not less than 250 kg/cm, and
(C) an Elmendorf tear strength of not less than 60 kg/cm in the machine direction.

6. The ethylene resin packaging film as claimed in claim 1, which has:
(A) a Young's modulus of not less than 4,000 kg/cm$^2$, and
(B) a dart impact strength of not less than 55 kg/cm.

7. The ethylene resin packaging film as claimed in claim 2, which has:
(A) a Young's modulus of not less than 4,000 kg/cm$^2$, and
(B) a dart impact strength of not less than 55 kg/cm.

8. The ethylene resin packaging film as claimed in claim 3, which has:
(A) a Young's modulus of not less than 4,000 kg/cm$^2$, and
(B) a dart impact strength of not less than 55 kg/cm.

* * * * *